United States Patent [19]
Cohen et al.

[11] 3,925,489

[45] Dec. 9, 1975

[54] METHOD FOR PRODUCING HYDRATES OF SODIUM CHLOROPHENATE AND HYDRATES PRODUCED THEREBY

[75] Inventors: Robert S. Cohen, Dover; Lila J. Crites, Tuscarawas, both of Ohio

[73] Assignee: Dover Chemical Corporation, Dover, Ohio

[22] Filed: Apr. 15, 1968

[21] Appl. No.: 721,173

[52] U.S. Cl............................................ 260/623 R
[51] Int. Cl.²................... C07C 39/36; C07C 39/24
[58] Field of Search............ 260/623, 621 R, 623 R

[56] References Cited
UNITED STATES PATENTS
3,499,045   3/1970   Cleary............................ 260/623 R Primary Examiner—Bernard Helfin
Assistant Examiner—W. B. Lone
Attorney, Agent, or Firm—Lane, Aitken, Dunner & Ziems

[57] ABSTRACT

The addition of a sufficient quantity of DMSO and water to a water solution of sodium chlorophenate to precipitate an insoluble sodium chlorophenate decahydrate. The decahydrates of sodium chlorophenate.

10 Claims, No Drawings

METHOD FOR PRODUCING HYDRATES OF SODIUM CHLOROPHENATE AND HYDRATES PRODUCED THEREBY

Background of the Invention

In copending application Ser. No. 284,991 filed June 3, 1963 (the disclosure of which is hereby incorporated herein by reference), methods are disclosed for producing various chlorinated hydroxy compounds, one of the most significant of which is the production of pentachlorophenol through the hydrolysis of hexachlorobenzene. The essence of the process disclosed in said copending application for the production of pentachlorophenol involves the hydrolysis of hexachlorobenzene with an alkaline hydrolyzing agent in the presence of a certain class of reaction media, the preferred one of which is dimethylsulfoxide (hereinafter referred to as "DMSO").

The process of producing pentachlorophenol as disclosed in said copending application actually involves four separate stages. The first stage involves the hydrolysis of the hexachlorobenzene to sodium pentachlorophenate, the second stage involves the acidification of the resulting reaction solution (which contains not only the sodium pentachlorophenate but water, sodium chloride and the DMSO) to form pentachlorophenol as a precipitate mixed with sodium chloride solution and some DMSO (the bulk of the DMSO being filtered off from the precipitate with the mother liquor), the third stage involves the removal of the sodium chloride and the residual DMSO from the pentachlorophenol precipitate through a water wash (the former two being soluble in water, the pentachlorophenol not being soluble) and, lastly, the fourth stage involves the recovery of the DMSO to prepare it for reuse in a continuous process.

The process disclosed in said copending application provides extremely significant advantages over prior art processes for producing pentachlorophenol. In the first place, only small quantitites of solvent are required compared to processes involving other kinds of reaction media. Secondly, the solvent is readily recoverable without complicated and expensive processing. Furthermore, the reaction occurs at higher speeds with lower reaction temperatures than are useable in prior art processes.

The foregoing significant advantages make the process of said copending application an extremely attractive approach to the production of pentachlorophenol, which is a particularly valuable compound for use in the insecticidal, fungicidal, pesticidal and bactericidal fields. In the process for producing pentachlorophenol as disclosed in said copending application, however, a compound is produced as an intermediate product, sodium pentachlorophenate, which is of even greater commercial value than pentachlorophenol. Unfortunately, however, it has heretofore been much more costly to recover sodium pentachlorophenate either during the course of said process of said copending application or by any other process suggested in the prior art than to recover pentachlorophenol.

Merely by way of example, it was mentioned previously and is described in great detail in said copending application that the product of the first stage of the reaction disclosed therein is a solution containing a mixture of sodium pentachlorophenate, sodium chloride, water and DMSO.

Attempts to isolate the sodium pentachlorophenate from said solution by various methods including crystallization, cooling, distillation and the like have all been ineffective in producing sodium pentachlorophenate.

While it is possible to produce sodium pentachlorophenate from the pure pentachlorophenol obtained from stage 3 of the process of said copending application by reacting the pentachlorophenol with sodium hydroxide to form the sodium pentachlorophenate, this procedure is costly not only because of the requirement for additional caustic to neutralize the pentachlorophenol to form the sodium pentachlorophenate but because of the requirement for prior neutralization of both the sodium pentachlorophenate and excess caustic contained in the crude solution obtained from stage 1 of the process through acid treatment (as noted in the description of stage 2 of the process).

Alternative prior art techniques of producing pentachlorophenol are equally disadvantageous. Thus, sodium pentachlorophenate may be made through the chlorination of phenol to form pentachlorophenol, followed by purification and the subsequent neutralization of the pentachlorophenol with sodium hydroxide to form sodium pentachlorophenate. Once again, this is an extremely expensive procedure.

Summary of the Invention

In accordance with the present invention, a process has now been discovered for producing sodium pentachlorophenate in almost quantitative yield in extremely high purity by an extremely simple and economical process. In its broader aspects, the process of the present invention involves the formation of a water insoluble sodium chlorophenate having a fixed quantity of water of hydration (which, in the preferred form of the invention, is sodium pentachlorophenate decahydrate) from an aqueous solution containing dissolved sodium chlorophenate by bringing the solution in the presence of DMSO to a temperature not exceeding that temperature at which said insoluble chlorophenate comes into existence and precipitates from said solution. The present application is equally directed to products resulting from said process.

It is accordingly an important object of the present invention to provide a novel process for forming a water insoluble sodium chlorophenate having a fixed quantity of water of hydration and products resulting therefrom.

It is another important object of the present invention to provide a novel process for forming sodium chlorophenate hydrates from an aqueous solution containing dissolved sodium chlorophenate involving the use of DMSO.

It is still a further object of the present invention to remove an insoluble sodium chlorophenate hydrate from a solution containing dissolved sodium chlorophenate, DMSO and water, first removing from the solution a sufficient portion (less than the whole) of DMSO and adding a sufficient quantity of water to the residue at an appropriately low temperature to cause the insoluble hydrate to form.

These and other objects and advantages of the present invention will become more apparent in connection with the ensuing description and appended claims.

Description of the Preferred Embodiments

Reduced to its simplest terms, the invention to which the present application is directed is built around the astonishing discovery that in the presence of DMSO at an appropriately low temperature, the addition or presence of sufficient water in a solution of a sodium chlorophenate results in the immediate precipitation of a flaky, easily filtered, solid sodium chlorophenate in hydrate form in almost quantitative yield in extremely high purity. The hydrate which is formed is the decahydrate. This invention can best be illustrated by the following examples:

Example 1

Hexachlorobenzene (1000 gms.) and DMSO (4000 gms.) were mixed to form a slurry and heated to about 100°C. A solution of sodium hydroxide (352 gms.) in water (352 gms.) was added to this slurry and the temperature of the mixture raised to the boiling point and the mixture refluxed until the reaction was complete. The refluxing took place at about 135°–160°C. for about 6 hours. The completion of the reaction was determined by complete removal of the hexachlorobenzene from the solution as indicated by lack of crystals in the solution and as verified chromatographically by the absence of any volatile organics other than DMSO.

The bulk of the DMSO and water (3500 ml) was then removed through vacuum distillation at 90°–110°C. and 25 mm. absolute pressure. (The removal of the remainder of the DMSO was attempted by oven drying, but this was not successful since it resulted in a black mushy mass.) Water at a temperature below 40°C. was then slowly added to the mass while stirring, causing the immediate formation of a tan solid. Water addition was continued until no more tan solid appeared. The excess water and successive washings were filtered off with suction using a Buchner funnel. These washings carried with them the dark brown solution of DMSO, NaCl and NaOH. Undoubtedly a small amount of product was lost in these washings also. The wet sodium decahydrate salt was sucked dry on the Buchner funnel to remove all the uncombined water and leave a flaky brown solid.

This solid was determined to be sodium pentachlorophenate decahydrate. The hydrate yield was 1570 grams; the combined water content was determined with the moisture balance (by drying at 130°C. to constant weight) to be 38% or 597 grams and the sodium salt remaining 973 grams. This represents 3.4 moles of sodium salt to 33 moles of water or a formula of $NaOC_6Cl_5 \cdot 10 H_2O$. The theoretical yield for the sodium salt is 1010 grams. The yield was, therefore, 96% with a purity of 95% (titriometrically).

The decahydrate may be converted to sodium pentachlorophenate monohydrate (the preferred commercial form) by mixing together in a dry blender the stoichiometric amount of decahydrate (46.9 gms.) and dry sodium salt (259.6 gms.) to give about ¾ pound of product, with the blender being heated with heat lamps to 90°C. to effect the reaction. The resulting form of monohydrate is a hard purplish-brown kernel which resembles Grape Nut Flakes.

Pentachlorophenol may be readily prepared from the decahydrate by dissolving the decahydrate above 40°C. in an equal weight of water, acidifying with HCl to form the phenol, filtering out the precipitated phenol and drying it in an oven.

Example 2

Hexachlorobenzene (5000 gms.), DMSO (12,475 gms.) and sodium hydroxide (3,150 gms. of 50% NaOH) were mixed as in example 1 and refluxed in a 22 liter flash with stirring until the chromatograph showed no hexachlorobenzene present. This required 10 hours of refluxing at 135°C.

8000 ml. of DMSO and water were distilled off from the hydrolysis reaction product at 90°C. and 30 mm. of vacuum. 10,000 ml of water the temperature of which was below 40°C. was added to the residue left in the flask to form a "slatherly" hydrate. Two pounds were removed with a dipper, filtered, washed with water containing 1% DMSO and dried at 50°–100°C. for 4 hours. About ¾ pound of sodium pentachlorophenate powder was recovered.

All of the foregoing examples are directed to the recovery of sodium pentachlorophenate by first forming the decahydrate. While this is the preferred product of the present invention, the inventive concept to which this application is directed is more broadly applicable to the formation of the hydrates of sodium shlorophenates generally, with the sodium trichlorophenate decahydrate and sodium tetrachlorophenate decahydrate being next in line of preference to the sodium pentachlorophenate decahydrate.

The directly obtained products of the process of the present invention are, of course, the sodium chlorophenates in hydrate form. These hydrates can be readily converted to their corresponding commercially useful sodium chlorophenate monohydrates by conventional dehydration techniques, as noted in example 1. This dehydration procedure involves heating the decahydrate at about 130°C. until the water of hydration has been evaporated and the chlorophenate remains as a dry powder. Water or decahydrate salt is added to the powder until the stoichiometric ratio of sodium chlorophenate and water are present to form the monohydrate. The mixture is heated to facilitate even mixing, ultimately resulting in the formation of an agglomerate of the monohydrate which has the appearance of Grape Nut Flakes.

As previously noted, in order for the process of the present invention to take place the DMSO must be present in the aqueous solution of the sodium chlorophenate. While those skilled in the art will have no difficulty determining the quantity of DMSO which is to be present in the solution in light of the present disclosure, the sodium chlorophenate solution should contain at least approximately 1% of DMSO (based on the total weight of the sodium chlorophenate in solution). The preferred minimum DMSO weight concentrations (based on total weight of the sodium chlorophenate) are about 1% for sodium trichlorophenate, about 2% for sodium tetrachlorophenate and about 3% for sodium pentachlorophenate.

These minimum percentages are the optimum minimum percentages for producing the maximum yields of the desired decahydrate, the maximum yield of sodium trichlorophenate decahydrate on a dry basis being 10% with a 1% DMSO concentration, that of the sodium tetrachlorophenate decahydrate being 50% on a dry basis with a 2% DMSO concentration and the maximum yield of the sodium pentachlorophenate decahydrate on a dry basis being 99% with 3% DMSO concentration. Using more DMSO does not significantly improve the recovery of the trichloro or tetrachlorophenates.

The significance of the minimum concentration of DMSO is further illustrated by the solubility characteristics of the decahydrates of the present invention. More specifically, sodium pentachlorophenate decahydrate is soluble only to the extent of approximately 1% by weight in wash water (with or without 1% caustic) at temperatures below about 40°C. providing such wash water contains 1% by weight of DMSO. On the other hand, sodium pentachlorophenate decahydrate readily dissolves at room temperature in water containing no DMSO (with or without 1% caustic), such dissolution not taking place (with or without 1% caustic) at room temperature when the water contains 1% by weight of DMSO. Sodium trichlorophenate decahydrate and sodium tetrachlorophenate decahydrate show similarly dramatic solubility variations with and without the presence of an appropriate minimum quantity of DMSO.

It is similarly undesirable in the practice of the process of the present invention to have too much DMSO present in the aqueous sodium chlorophenate solution. More specifically, if water is added to the sodium chlorophenate while there is still a large amount of DMSO present the sodium chlorophenate decahydrate will not crystallize from the solution. On the contrary, the contents of the mixture will remain in solution since the water is soluble in the DMSO and will not be available to form the insoluble decahydrate.

Generally speaking, the amount of DMSO present in the solution for best results should be no greater than about 2 parts by weight of DMSO to one part by weight of the sodium chlorophenate in solution.

It has been found that if the starting point of the process of the present invention is a reaction mass such as is obtained from the first stage of the process disclosed in said copending application Ser. No. 284,991 (which contains water, DMSO, sodium chloride and sodium pentachlorophenate, all in solution), the appropriate quantity of DMSO is obtained if the solution is evaporated to (but not beyond) the point at which the solution is in the form of a pourable slurry. Such slurry will be a viscous dark brown mass having a mud-like consistency.

The amount of water added to the solution is not particularly critical, so long as an adequate amount is added to form the insoluble decahydrate. Generally speaking, so long as the appropriate amount of DMSO is present in the system, sufficient water may be added until the decahydrate stops precipitating from the solution (the precipitate which is formed is readily visible and the terminal point of the precipitation may be visually observed). It is normally desirable to use at least a slight excess of water to make certain that complete precipitation of the decahydrate has taken place.

It makes no difference in the process of the present invention whether the water or DMSO is added first, though ordinarily it is preferred to have the DMSO mixed with the sodium chlorophenate before the water is added since this facilitates the carrying out of the process.

Another important aspect of the present invention is the temperature at which the process is carried out. It has been discovered that operating under atmospheric conditions, there is a maximum temperature below which the process should be carried out for satisfactory results. When the sodium pentachlorophenate decahydrate is being formed, the initial temperature of the solution is immaterial but the decahydrate precipitate will not form until the temperature is no greater than about 40°C. Merely by way of example, it was previously noted that sodium pentachlorophenate decahydrate is soluble only to the extent of approximately 1% by weight in wash water at temperatures below 40°C. when such wash water contains about 1% by weight of DMSO. If the sodium pentachlorophenate decahydrate solution is warmed to a temperature above 40°C. (whether or not the solution contains 1% of DMSO), the sodium pentachlorophenate decahydrate will completely go into solution, though it will re-precipitate in the presence of such DMSO when the solution is recooled to about 40°C. or below.

This temperature above which the desired precipitation of the desired decahydrate won't take place and below which it will varies depending upon the decahydrate in question. As noted, it is about 40°C. in the case of sodium pentachlorophenate decahydrate, the yield of this material being 99% at or below this temperature. In the case of the sodium tetrachlorophenate decahydrate, the temperature should preferably be about 25°C. or less since the maximum yield of the tetra compound (50%) is obtained at or below this temperature. Thus, on mixing equal weights of the sodium tetrachlorophenate decahydrate with water containing 1% DMSO at 25°C., approximately 50% of the solids will dissolve, with all the solids dissolving above about 40°C. Similarly, in the case of sodium trichlorophenate decahydrate, the temperature should also be about 25°C. or less since the maximum yield of the tri compound (10%) is obtained at or below this temperature. Thus, on mixing equal weights of the trichlorophenate decahydrate with water containing 1% DMSO below about 25°C., about 90% of the solids will dissolve, with everything dissolving above about 40°C.

The temperature at which the formation of the decahydrate will take place can be reached before or after the addition of the DMSO and water to the sodium chlorophenate, though it is preferably maintained below the desired temperature during the addition of the appropriate materials and thorough mixing to facilitate observation of the decahydrate formation.

The advantages of the process of the present invention should be readily obvious to those skilled in the art. The most significant advantage is that when the insoluble sodium chlorophenate hydrate is formed, it can immediately be separated from all the contaminating and diluting salts present, even including the excess caustic which is used in a hydrolysis process such as is employed in said copending application Ser. No. 284,991. This results in an extremely significant saving in the process of said copending application in the avoidance of the requirement for neutralization of the excess caustic, which can then be used in the next hydrolysis sequence. Even more importantly, if sodium pentachlorophenate were to be made from the process of the copending application, the normal sequence would require an entire additional cycle involving the recovery and purification of pentachlorophenol first by precipitation, which would mean that all of the sodium salt and excess caustic would have to first be neutralized. The recovered pentachlorophenol must then be redissolved in caustic and an evaporation performed to recover the sodium salt crystals. All this procedure is avoided by the process of the present invention.

The sodium chlorophenate decahydrate produced from the process of the present invention may, as previously noted, be readily converted to the corresponding sodium chlorophenate monohydrate. The monohydrate, of course, has well recognized uses. Merely by way of example, sodium pentachlorophenate monohydrate is a material sold by the Dow Chemical Company under the trade name "Dowicide G" which is useful in the adhesive field to protect adhesives against bacterial decomposition and the accompanying loss of viscosity and reduction of adhesive properties. It is also useful as a pre-emergence weed killer against certain weed species and in the leather industry to give protection against mold or bacteria during processing. The monohydrates of the other sodium chlorophenates which may be prepared from the corresponding decahydrates of the present invention are useful for the same purposes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for forming water insoluble, sodium tri, tetra or penta chlorophenate hydrate from an aqueous solution containing a dissolved sodium chlorophenate selected from sodium tri, tetra and penta chlorophenate comprising establishing a sufficient quantity of dimethylsulfoxide in said solution such that, upon bringing the temperature of said solution to a point no greater than about 40°C at atmospheric pressure, said insoluble hydrate will form, and bringing the temperature of said solution to a point at which said insoluble hydrate comes into existence and precipitates from said solution.

2. A process as defined in claim 1, wherein the quantity of dimethylsulfoxide present in said solution is at least about 1% by weight based on the amount of dissolved sodium chlorophenate in said solution.

3. A process as defined in claim 2 wherein the quantity of dimethylsulfoxide present in said solution is at least the following approximate per cent by weight based on the amount of dissolved sodium chlorophenate in said solution:
sodium trichlorophenate: 1%
sodium tetrachlorophenate: 2%
sodium pentachlorophenate: 3%

4. A process as defined in claim 1 wherein the temperature to which said solution is brought at which said insoluble hydrate comes into existence is no greater than about 40°C.

5. A process as defined in claim 4 wherein said insoluble hydrate is the decahydrate of sodium tri, tetra and penta chlorophenates.

6. A process as defined in claim 5 comprising forming a compound selected from sodium tri, tetra and penta chlorophenates by dehydrating said decahydrate.

7. A process as defined in claim 1 wherein the maximum amount of dimethylsulfoxide present in said solution is about 2 parts by weight of dimethylsulfoxide to about 1 part by weight of dissolved sodium chlorophenate.

8. A process for forming water insoluble sodium tri, tetra, or penta chlorophenate hydrate from an aqueous solution containing a dissolved sodium chlorophenate selected from sodium tri, tetra and penta chlorophenate, comprising establishing a sufficient quantity of dimethylsulfoxide in said solution such that, upon bringing the temperatures of said solution to a point no greater than about 40°C. at atmospheric pressure, said insoluble hydrate will form, and bringing the temperature of said solution to a point at which said insoluble hydrate comes into existence and precipitates from said solution, the quantity of said dimethylsulfoxide being at least about 1% by weight based on the amount of dissolved sodium chlorophenate in said solution, the maximum amount of dimethylsulfoxide present in said solution being about 2 parts by weight of dimethylsulfoxide to about 1 part by weight of dissolved sodium chlorophenate.

9. A process for removing an insoluble hydrate of sodium tri, tetra or penta chlorophenate from a solution containing a sodium chlorophenate selected from sodium tri, tetra and penta chlorophenate, dimethylsulfoxide and water, the quantity of dimethylsulfoxide in said solution being such that said insoluble hydrate will not form upon the addition of water to said solution, comprising removing from said solution a sufficient portion of said dimethylsulfoxide less than the whole of said dimethylsulfoxide so that upon the addition of water to the residue resulting from said removal, said insoluble hydrate will form at a temperature below about 40°C, and adding a sufficient quantity of water to said residue and establishing the temperature of the resulting water residue mixture at said temperature below about 40°C to cause said insoluble hydrate to form.

10. A process for forming water insoluble sodium tri, tetra or penta chlorophenate hydrate from an aqueous solution containing a dissolved sodium chlorophenate selected from sodium, tri, tetra and penta chlorophenate, comprising establishing a sufficient quantity of dimethylsulfoxide in said solution at a temperature no greater than about 40°C to cause said insoluble hydrate to precipitate from said solution, the quantity of said dimethylsulfoxide being at least about 1% by weight based on the amount of dissolved sodium chlorophenate in said solution, the maximum amount of dimethylsulfoxide present in said solution being about 2 parts by weight of dimethylsulfoxide to about 1 part by weight of dissolved sodium chlorophenate.

* * * * *